US009310134B2

(12) United States Patent
Gilbert

(10) Patent No.: US 9,310,134 B2
(45) Date of Patent: Apr. 12, 2016

(54) WETTING OF EVAPORATIVE COOLER PADS

(71) Applicant: Robert William Gilbert, Willunga (AU)

(72) Inventor: Robert William Gilbert, Willunga (AU)

(73) Assignee: FF Seeley Nominees Pty. Ltd., St. Marys South (AU)

( * ) Notice: Subject to any disclaimer, the term of this patent is extended or adjusted under 35 U.S.C. 154(b) by 360 days.

(21) Appl. No.: 13/788,817

(22) Filed: Mar. 7, 2013

(65) Prior Publication Data

US 2013/0233005 A1 Sep. 12, 2013

(30) Foreign Application Priority Data

Mar. 8, 2012 (AU) ................................ 2012900922
Mar. 4, 2013 (AU) ................................ 2013201234

(51) Int. Cl.
| | |
|---|---|
| *F28C 1/00* | (2006.01) |
| *F28C 3/08* | (2006.01) |
| *F24F 5/00* | (2006.01) |
| *F24F 11/00* | (2006.01) |
| *F28D 5/02* | (2006.01) |
| *F24F 1/00* | (2011.01) |
| *F24F 6/00* | (2006.01) |
| *F24F 6/04* | (2006.01) |

(52) U.S. Cl.
CPC ................ *F28C 3/08* (2013.01); *F24F 5/0035* (2013.01); *F24F 11/0079* (2013.01); *F28D 5/02* (2013.01); *F24F 2001/0088* (2013.01); *F24F 2006/008* (2013.01); *F24F 2006/046* (2013.01); *Y02B 30/545* (2013.01); *Y02B 30/746* (2013.01)

(58) Field of Classification Search
CPC ..... Y02B 30/545; F24F 5/0035; F25D 17/065
USPC ........................... 62/91, 121, 186, 259.4, 304
See application file for complete search history.

(56) References Cited

U.S. PATENT DOCUMENTS

| | | | | |
|---|---|---|---|---|
| 4,389,352 | A * | 6/1983 | Bohanon, Sr. ................ | 261/106 |
| 5,606,868 | A * | 3/1997 | Calvert ......................... | 62/315 |
| 5,695,117 | A * | 12/1997 | Sizemore et al. ............ | 236/44 A |
| 5,775,580 | A * | 7/1998 | Sizemore et al. ............ | 236/44 E |
| 2003/0136143 | A1* | 7/2003 | Johnson et al. ............... | 62/304 |
| 2010/0313584 | A1* | 12/2010 | Lopez et al. .................. | 62/171 |

\* cited by examiner

*Primary Examiner* — Melvin Jones
(74) *Attorney, Agent, or Firm* — Tarolli, Sundheim, Covell & Tummino LLP

(57) ABSTRACT

A method of controlling the operation of an evaporative air cooler where the pads (2) of the cooler are intermittently wetted with an amount of water (14) in excess of the capacity of the pads (2) to absorb and retain during each wetting operation of the pad. The airflow (20) through the pads during intermittent wetting being limited to a velocity so as to not entrain water in the airflow during the wetting operation and the velocity of the airflow through the pads is increased after each intermittent wetting so as to raise the level of cooling output (22) of the cooler between each intermittent wetting operation.

20 Claims, 4 Drawing Sheets

WETTING OF EVAPORATIVE COOLER PADS

CROSS-REFERENCES TO RELATED APPLICATIONS

The present application claims foreign priority benefits under 35 U.S.C. §119(a)-(d) to currently pending Australian Patent Application No. 2013201234 filed 4 Mar. 2013 entitled WETTING OF EVAPORATIVE COOLER PADS, which claims priority to currently pending Australian Provisional Patent Application No. 2012900922 entitled WETTING OF EVAPORATIVE COOLER PADS filed Mar. 8, 2012. The present application claims priority the above-identified patent applications, which are incorporated in their entireties herein by reference for all purposes.

FIELD OF THE INVENTION

This invention relates to evaporative air coolers used for the comfort cooling of building space. In particular, the invention relates to method and means for wetting evaporative pads of evaporative coolers and the provision of evaporative coolers in a more compact configuration.

DESCRIPTION OF THE PRIOR ART

Throughout this description and the claims which follow, unless the context requires otherwise, the word "comprise", or variations such as "comprises" or "comprising", will be understood to imply the inclusion of a stated integer or step or group of integers or steps.

The reference to any prior art in this specification is not, and should not be taken as, an acknowledgement or any form of suggestion that that prior art forms part of the common general knowledge in Australia.

An evaporative air cooler essentially comprises a fan, evaporative pads, a pump, water distribution means and a cabinet to contain these components which also incorporates a water reservoir. The evaporative pads are kept wet by pumping water from the water reservoir via a water distribution system. In operation outside air is drawn through these wetted evaporative pads and is cooled by the evaporation of water from within the evaporative pads. The cooled air then passes through the fan to ducting for distributing air to the space to be kept cool.

The evaporative pads are made from a media which is easily wetted while allowing air to pass through the media and interacting with the wetted surfaces within the media. The evaporative media has the characteristics of high internal surface area, good retention of water, good wicking characteristics and structural integrity. Traditionally, shredded wood wool contained within an open frame has been used as an evaporative medium. More recently, manufactured media made from resin impregnated corrugated paper has become almost universally popular. The corrugated paper media has all the desired characteristics as well as its own structural integrity when formed into an evaporative pad without necessarily requiring it to be contained in a frame.

Traditionally the evaporative media has been kept continually wetted while the evaporative cooler is in operation. This requires water to flow continuously through the media. A percentage of the water flow is evaporated into the airstream passing through the media, generally orthogonal to the direction of water flow while any water not evaporated runs out of the bottom of the media and returns to the water reservoir. The rate of evaporation of water is determined by the psychrometric properties of the air entering the evaporative pads and the rate of air flow. The total water flow rate circulating through the pads is determined by the characteristics of the pump and water distribution means.

All types of evaporative media pads have a limiting velocity of air flow which can be passed through the media without undesirable consequences. A most important consequence to be avoided is for free water within the media to detach and become entrained in the air flow stream as droplets. This tendency to detach is determined by the type of media, the rate of water flow in excess of that required for evaporation and the velocity of air through the media. Consequences of water inclusion in the delivered air stream include wetting and leaking from ductwork, accelerated corrosion of ducting and accumulation of salt deposits (from salts dissolved in the water) inside the conditioned space.

The water flow rate in excess of evaporation is determined at the design stage. It must be sufficient to ensure complete wetting of the evaporative media under the most adverse weather conditions, and enough to ensure dirt and salt deposits within the media are flushed to the reservoir. In practice, the water flow rate is usually set between 5 and 10 times the evaporation rate under design conditions. This ensures there is still sufficient excess water under the most adverse weather conditions.

With water flow rates within the usual limits, the limiting air velocity through the evaporative media pads has been found by experiment to be about 2.5 m/s for corrugated paper media and a little higher at around 3 msec for wood wool media.

The design of evaporative coolers is based on these limitations of airflow velocity through evaporative pads. The area of evaporative pad required is determined by the design total air delivery rate of an evaporative cooler, divided by the allowable air flow velocity. This determines the fundamental dimensions of an evaporative cooler, setting the boundaries for the balance of a cooler design.

It would be commercially advantageous if the allowable airflow through the evaporative media could be increased. This would allow reduction of the area of evaporative pad required to achieve the design performance and a more compact overall design could be possible. A side benefit could be an evaporative cooler with a lower height thereby reducing the aesthetic intrusion of the cooler on the roofline of the building. An overall smaller evaporative cooler for equivalent total airflow delivery will have obvious advantages in manufacturing cost.

The air velocity through the evaporative media could be increased considerably if the media was intermittently wetted but had no additional water flow through it during most of its operation. Under these circumstances, there would be no free water on the surfaces within the evaporative media and therefore no tendency for water to become entrained in the airflow across the surfaces. There will remain a requirement that all surfaces within the evaporative media always remain wet. This requirement can be met by constructing the media from material which can retain substantial volumes of water within itself through a porous characteristic, and with the capacity to readily distribute water to all surfaces through internal wicking. Typically, the corrugated paper media currently available satisfies these requirements.

SUMMARY OF THE INVENTION

In a first aspect the present invention provides a method of controlling the operation of an evaporative air cooler, said method comprising intermittently wetting an evaporative pad of the cooler with an amount of water in excess of the capacity of the pad to absorb and retain during each wetting operation of the pad, varying the airflow through the pad during the intermittent wetting to a velocity so as to not entrain substantial quantities of water in the airflow during the wetting, and increasing the velocity of the airflow through the pad after each intermittent wetting so as to raise the level of cooling output of the cooler between each intermittent wetting.

An embodiment of the first aspect operates by reducing the airflow speed through a pad before a wetting is commenced and delaying increasing the airflow speed until a predetermined period after wetting has ceased.

Preferably, the method of this invention is applied to an evaporative cooler comprising a plurality of separate evaporative pad sets and wherein each pad set includes an associated separately controllable fan for varying the airflow there through.

In another aspect the present invention provides a control system for an evaporative cooler for controlling the velocity of airflow through evaporative pads of the cooler in association with intermittent wetting of the pads with quantities of water in excess of the capacity of the pads to absorb and retain during the wetting, said control system determining the velocity of airflow through the pads and being adapted to vary that velocity in dependence upon a period of wetting of the pads and another period of operation of the cooler apart from each period of wetting.

In a preferred embodiment the control system employs a static pressure transducer downstream of the airflow through each pad whereby a pressure differential between each respective downstream transducer and ambient atmospheric pressure provides a measure of the airflow velocity through the pad.

In a further preferred embodiment the control system employs static pressure transducers upstream and downstream of the airflow through each pad whereby a pressure differential between each respective upstream and downstream transducer provides a measure of the airflow velocity through the pad.

Still further embodiments of the control system employ a hot wire or rotating vane anemometer in the downstream airflow from each pad to provide a measure of the velocity of the airflow through the pad.

BRIEF DESCRIPTION OF THE DRAWINGS

The present invention will now be described by way of example with reference to the accompanying drawings, in which.

DESCRIPTION OF EMBODIMENTS

Figure 1:
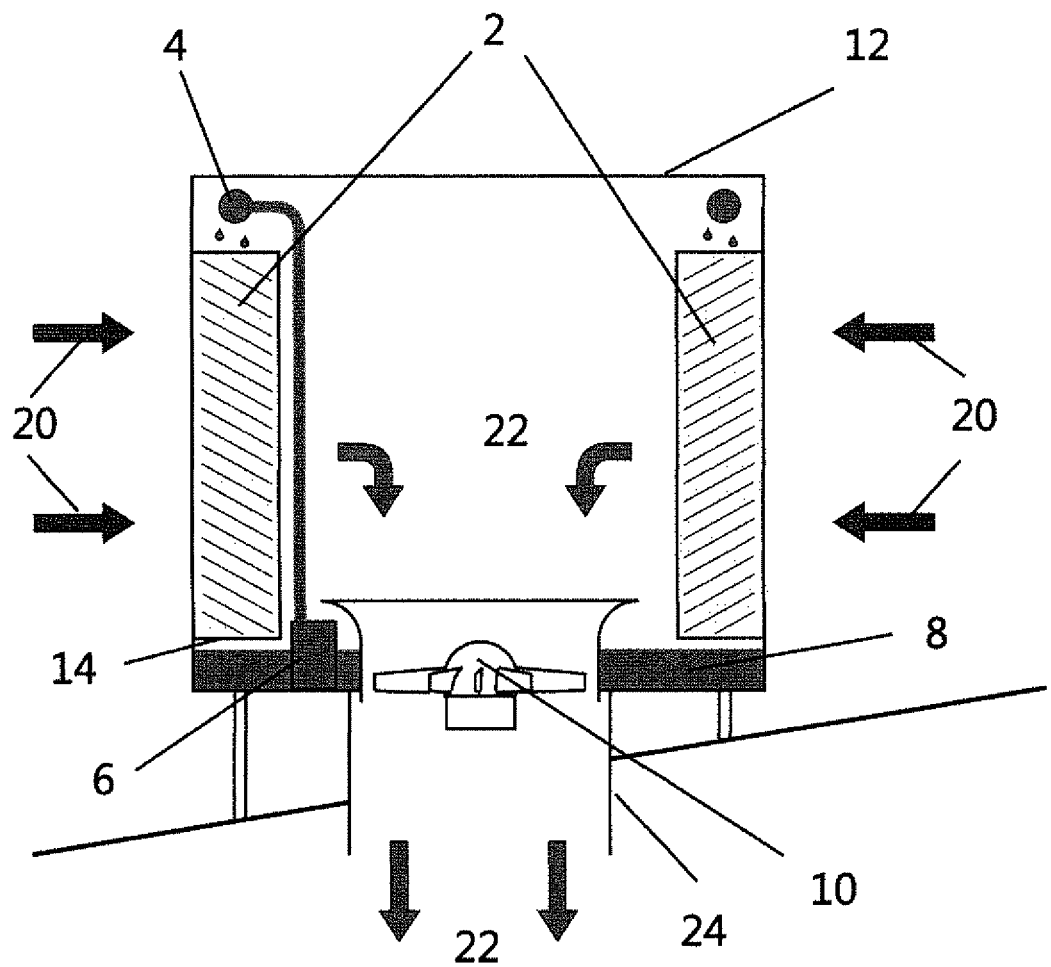
FIG. 1 schematically shows a typical prior art evaporative air cooler with its component parts.

In a typical prior art evaporative air cooler of FIG. 1, water from reservoir 8 is moved by pump 6 to water distribution system 4 which distributes water to the top of evaporative pads 2. Water travels through the evaporative pads 2 under gravity with excess water 14 returning from the underside of pads 2 to reservoir 8.

A fan 10 draws air 20 into the evaporative pads 2 thereby cooling the air by evaporation. After passing through the evaporative pads 2 and then fan 10, cooled air 22 is delivered to the ducting 24 for distribution to a conditioned space.

The combination of total air delivery (cooled air 22) and the total face area of evaporative pads 2 subjected to incoming air 20 determines the velocity of air entering the evaporative media of evaporative pads 2.

Figure 2:
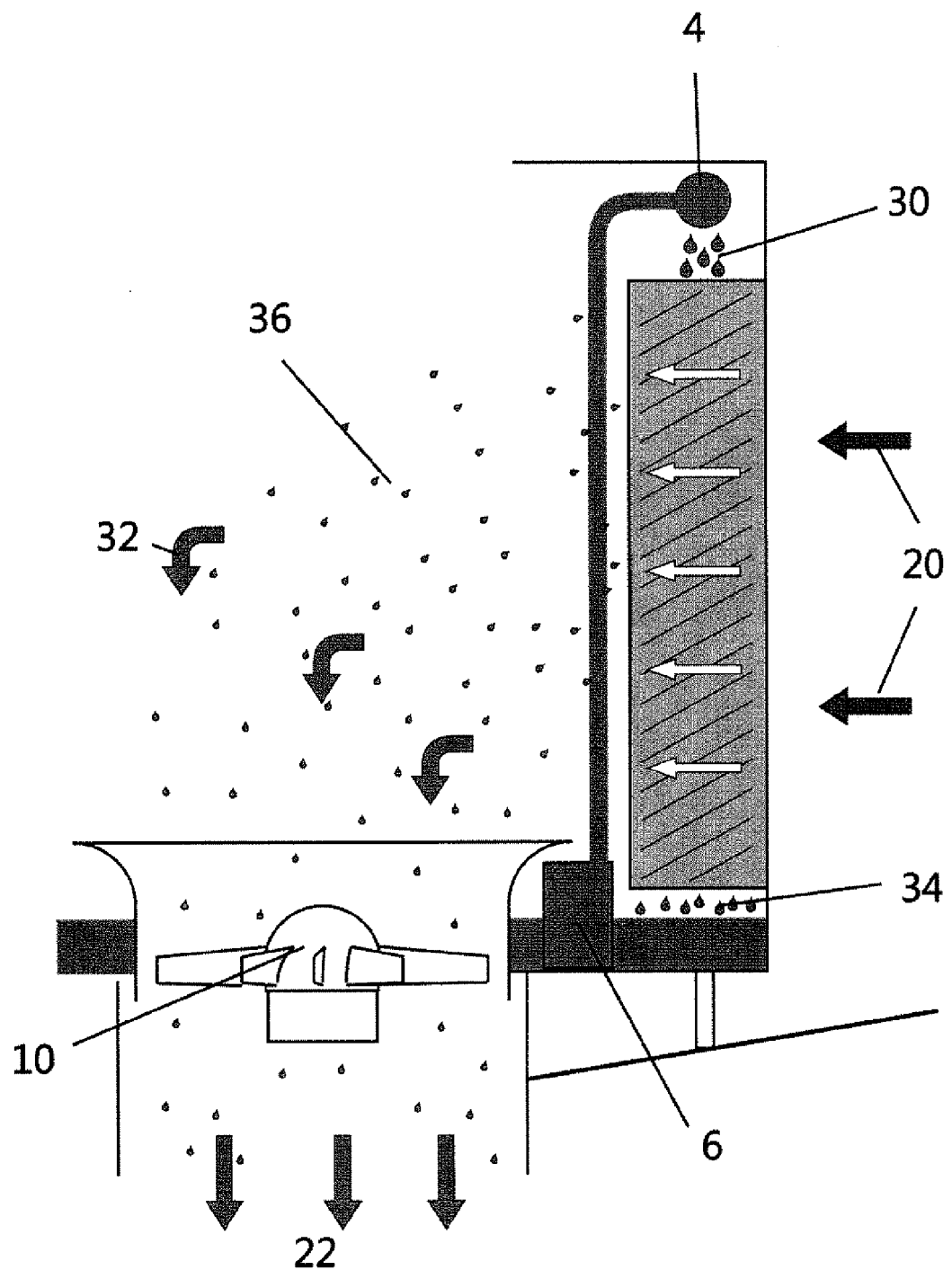
FIG. 2 shows a section through an evaporative pad of the cooler of FIG. 1 illustrating water entrainment in the airflow.

FIG. 2 schematically shows the effects of an evaporative pad when subjected to excess water. Water droplets from within the evaporative media can be entrained in the air flow as it passes through the evaporative pad. Water 30 from water distribution system 4 is distributed to the top of evaporative pad 2. As this water flows down through evaporative pad 2 in a generally vertical direction under gravity, air flow 20 (which will be hot dry air under normal operating conditions) enters the evaporative pad orthogonal to the water flow down through the pad. As the air flows through the pad, a proportion of the water wetting the internal surfaces of the evaporative pad will evaporate into the air flow. This evaporation will cool the internal surfaces of the pad media, which will then cool the temperature of the air flowing through the pad. Air flow 32 exiting the evaporative pad will therefore be cooler and have a higher humidity than the airflow 20 entering the evaporative pad. The rate of evaporation is dependent on the psychrometric properties of the air 20 entering the pad and the velocity of air flow 20.

Any water flowing through the evaporative pad in excess of the evaporation rate into the airflow passing through leaves the evaporative pad from the bottom and is returned to reservoir 8. This excess water is depicted as water 34 in FIG. 2.

This water in excess of evaporation requirements means that there will always be free water on the internal surfaces of the evaporative media. If the airflow across this free surface water is high enough, water will be displaced from the surfaces and become entrained in the airflow leaving the evaporative pad. The entrained water is shown as droplets 36 in FIG. 2. Entrained water in the airflow of an evaporative cooler is an undesirable condition. The airflow required to cause free surface water within the evaporative media to become entrained in the airflow is dependent on the degree of excess water available and the velocity of air entering the evaporative pad.

Figure 3:
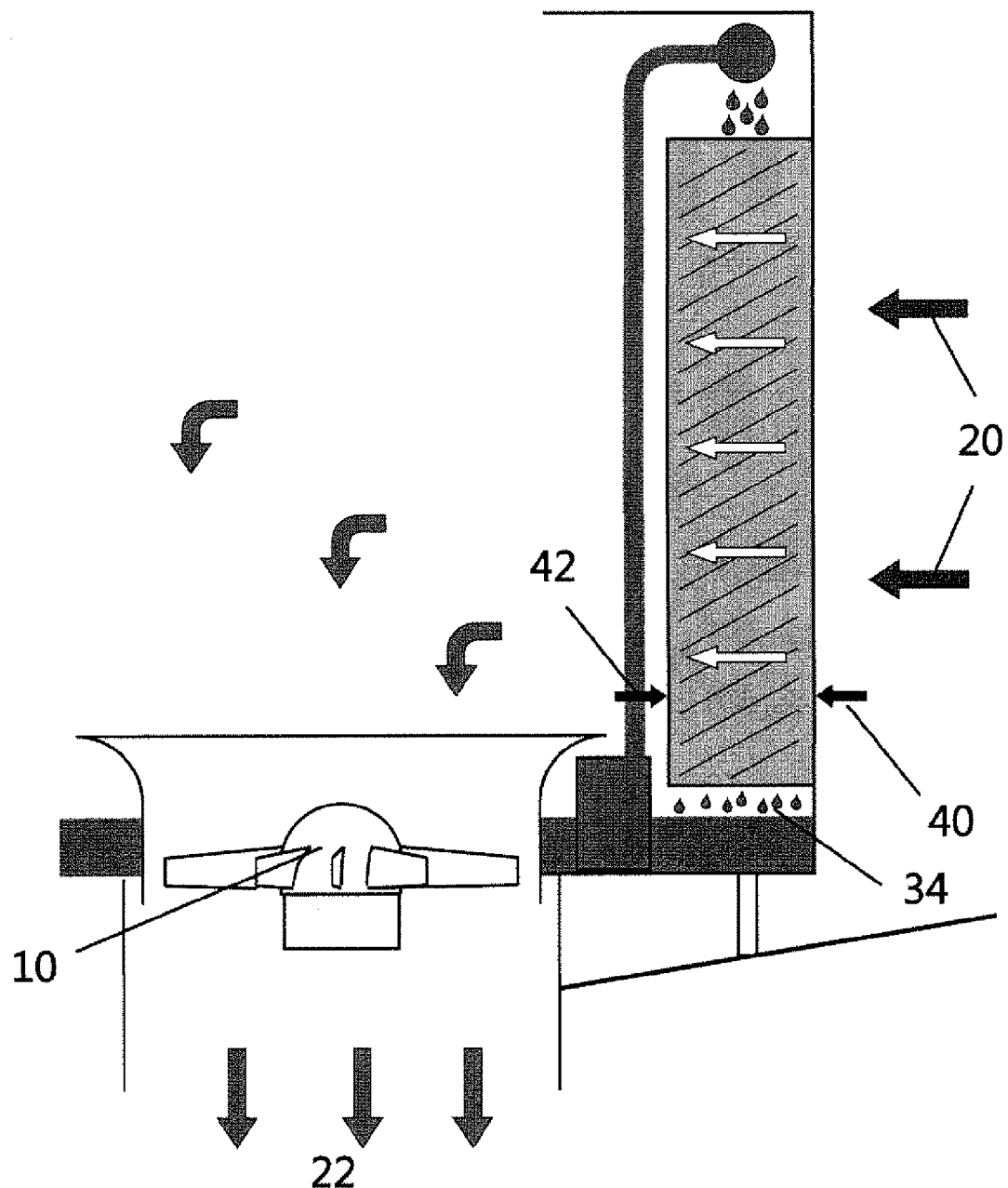
FIG. 3 is a section view similar to FIG. 2 showing controlled water circulation and differential pressure monitoring across the evaporative pad in accordance with an embodiment of the present invention.

An embodiment of the present invention in FIG. 3 incorporates a control system with inputs from static pressure transducer 40 located on a side of the evaporative pad external to the evaporative cooler, and a static pressure transducer 42 located on the inside of the evaporative cooler downstream of the evaporative pads. The difference in outputs of transducers 40 and 42 measures the static pressure differential across the evaporative pad induced by the airflow through the pad. This static pressure differential has a direct relationship to the air velocity through the evaporative pad and correlates to a measure of that velocity.

The control system of the evaporative cooler is programmed to use this measure of air velocity to control the wetting of the evaporative pads. During a wetting sequence, the control system reduces the speed of fan 10 until the air velocity through the evaporative pad is below the velocity known to result in water entrainment in the airflow through the pad. Water is then applied via the pump and water distribution system for a period of time to achieve complete wetting of the evaporative media and the flushing of any dirt or contaminants caught in the evaporative pad back into the reservoir.

At the end of the time required for wetting, the water distribution system is turned off (generally by simply turning off the pump or switching a valve), and any free water within the evaporative media is allowed to flow back into the reservoir. At this time, the speed of fan 10 is increased resulting in an increase in the airflow through the evaporative pads. Since there is now no free water on the internal surfaces of the evaporative media, there will be no water available to be entrained in the airflow. It is found that the airflow can be increased substantially above the prior art method of operation without any significant risk of water entrainment.

When the evaporative cooler is operated without constantly flowing water, evaporation and cooling of the airflow still occurs but from water stored within the bulk of the material from which the evaporative media pads are manufactured. The evaporative media pads are manufactured from materials with the property of retaining relatively large quantities of water within the material and the property of readily wicking the stored water to all surfaces within the media. It is found from experience that the evaporative media can continue to cool and humidify the air passing through it for a considerable period of time before it is necessary to wet the pads again using the watering sequence described above.

With this method of operation, the airflow through the evaporative cooler can increased considerably over the airflow in an equivalent prior art cooler at all times except during the wetting sequence. Since the wetting sequence only requires a small percentage of the operating time (typically 10%-20%), an evaporative cooler using the method of the present invention can deliver considerably more cooled air on average than the equivalent prior art cooler. Alternatively, an evaporative cooler of equivalent capacity to prior art coolers could be designed to be considerably smaller than such prior art coolers since much less surface area of evaporative pad is required to achieve the same performance.

It will be appreciated that there are many methods by which the velocity of airflow through evaporative pads can be measured for use in controlling a cooler in accordance with the present invention. It would be possible to use only a single pressure transducer to estimate the pressure differential since the reference pressure outside of the evaporative cooler is the nominal ambient atmospheric pressure. Alternatively, the air velocity through the pads could be measured using velocity transducers such as hot wire or rotating vane anemometers. This method of control can be applied by using any means of estimating air velocity.

The maximum time between wetting sequences to ensure continuous cooling of the air delivered by the evaporative cooler will be very dependent on the psychrometric condition of the air entering the pads. This period could be shortened considerably in very hot and dry environments. In a simple control system based on the current invention, fixed timers could be used to control both the wetting sequence and the time between wetting sequences. The time intervals could be based on experimental results for the normal design weather conditions, with an index factor applied to cover the worst anticipated weather condition. Such a control would work satisfactorily in terms of continuously delivering cooled air under all weather conditions, but would be wetting the pads more frequently than necessary under milder weather conditions.

As a further refinement in another embodiment of the current invention, a transducer is added which gives a continuous measurement of the psychrometric conditions of the incoming air. Measurement of air temperature and relative humidity is sufficient to calculate all the necessary properties of the air. From these measurements, the control system is able to estimate the rate of water evaporation from the pads during operation between wetting sequences and adjust the time interval between wetting sequences accordingly. Such an arrangement would maximise the air delivery by reducing the number of wetting sequences in mild weather with consequent increases in average performance.

Figure 4:
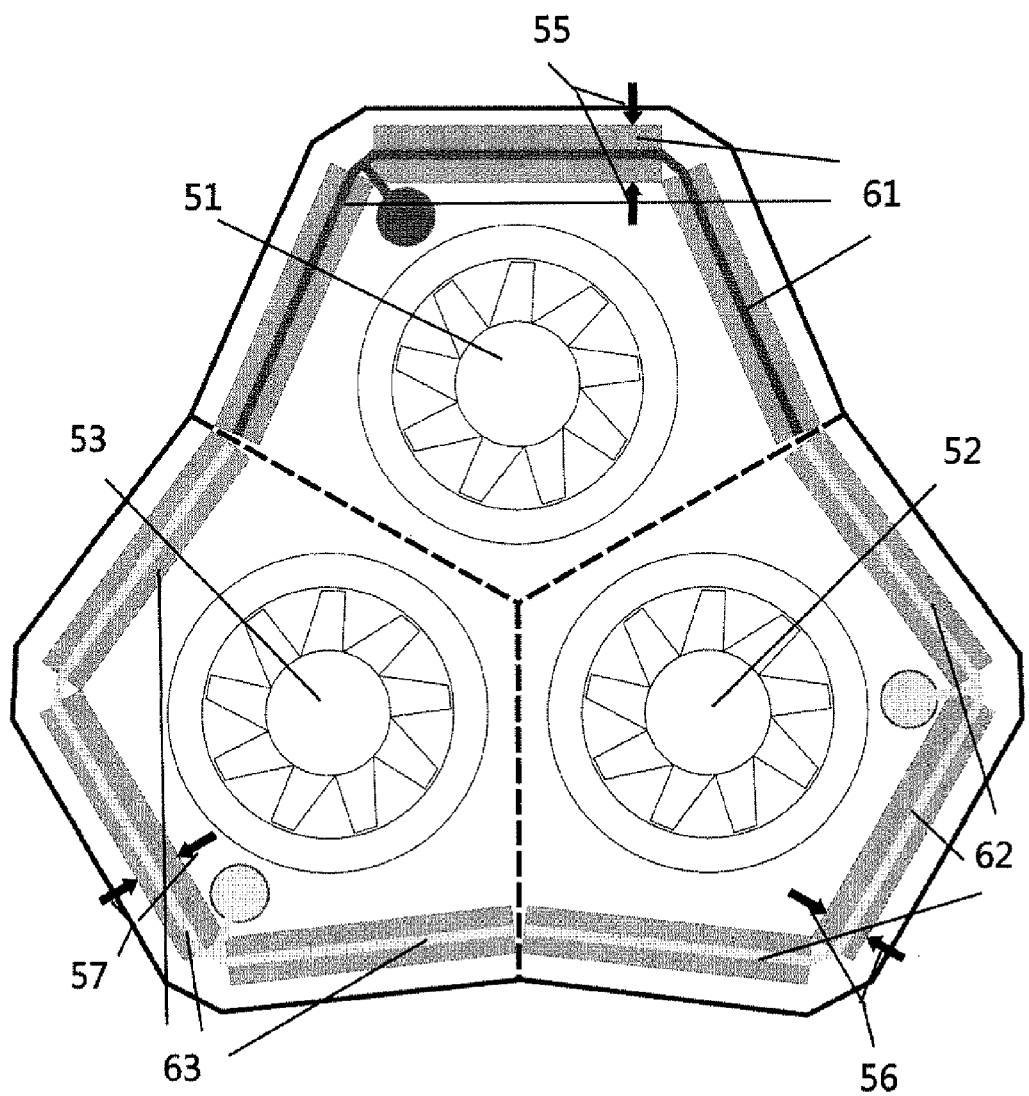
FIG. 4 shows a multi-fan evaporative cooler adapted to operate in accordance with the present invention

FIG. 4 shows a multi-fan evaporative cooler operating with a control system in accordance with an embodiment of the present invention. In operation, wetting sequences are undertaken sequentially between the evaporative pads influenced by each of the fans. The sequence begins with a first fan 51 and its immediately adjacent evaporative pads 61. This fan 51 is reduced in speed until the velocity through the evaporative pads 61 is below the critical velocity for water entrainment as measured by transducers 55 installed to deduce that velocity. A wetting sequence is then undertaken on this evaporative pad. At the conclusion of the wetting sequence, fan 51 is returned to normal operating speed and a wetting sequence of slowing the fan and then wetting the pad is commenced for pads 62 adjacent fan 52. This sequence is repeated until all evaporative pads have been wetted (for example, in FIG. 4, followed by the combination of fan 53 and evaporative pads 63). Each fan and evaporative pad combination wetting sequence is monitored by respective pressure transducer pairs 55, 56, 57. An entire wetting sequence is again commenced when the controller determines that it is time to re-commence the wetting sequences to ensure that continuously cooled air is delivered.

By application of this invention, compact, economical evaporative air coolers can be constructed which are smaller and less expensive than prior art coolers while delivering the cooling capacity of those larger prior art coolers.

I claim:

1. A method of controlling the operation of an evaporative air cooler, said method comprising intermittently wetting an evaporative pad of the cooler with an amount of water in excess of a capacity of the pad to absorb and retain during each wetting operation of the pad, varying an airflow through the pad during the intermittent wetting to a velocity so as to not entrain substantial quantities of water in the airflow during the wetting, and increasing the velocity of the airflow through the pad after each intermittent wetting so as to raise the level of cooling output of the cooler between each intermittent wetting.

2. The method as claimed in claim 1, wherein airflow speed through a pad is reduced before a wetting is commenced and increasing the airflow speed after a predetermined period after wetting has ceased.

3. The method of claim 1, when applied to an evaporative cooler comprising a plurality of separate evaporative pad sets and wherein each pad set includes an associated separately controllable fan or dampener system for varying the airflow therethrough.

4. A control system for an evaporative cooler for controlling the velocity of airflow through evaporative pads of the cooler in association with intermittent wetting of the pads with quantities of water in excess of a capacity of the pads to absorb and retain during the wetting, said control system determining a velocity of airflow through the pads and being adapted to vary that velocity in dependence upon a period of wetting of the pads and another period of operation of the cooler apart from each period of wetting.

5. The control system of claim 4, comprising a static pressure transducer downstream of the airflow through each pad whereby a pressure differential between each respective downstream transducer and ambient atmospheric pressure provides a measure of the airflow velocity through the pad as an input to the control system.

6. The control system as claimed in claim 4, comprising static pressure transducers upstream and downstream of the airflow through each pad whereby a pressure differential between each respective upstream and downstream transducer provides a measure of the airflow velocity through the pad as an input to the control system.

7. The control system as claimed in claim 4, comprising employ a hot wire anemometer in the downstream airflow from each pad to provide a measure of the velocity of the airflow through the pad as an input to the control system.

8. The control system as claimed in claim 4, comprising a rotating vane anemometer in the downstream airflow from each pad to provide a measure of the velocity of the airflow through the pad as an input to the control system.

9. The control system as claimed in claim 4, including fixed timers for controlling each period of wetting and each period between each wetting.

10. The control system as claimed in claim 4, including a transducer adapted to continuously measure psychrometric properties of air upstream of each pad and applying those measurements to the control system, the control system employing those measurements to estimate the rate of water evaporation from the pads during operation of a cooler between wetting sequences and adjust the time interval between wetting sequences based upon the estimate.

11. An evaporative cooler comprising a plurality of separate evaporative pad sets and wherein each pad set includes an associated separately controllable fan for varying an airflow therethrough, said cooler including a control system for controlling a velocity of airflow through each of said evaporative pads of the cooler in association with intermittent wetting of the pads with quantities of water in excess of the capacity of the pads to absorb and retain during the wetting, said control system determining the velocity of airflow through each of the separate pads and being adapted to vary that velocity in dependence upon a period of wetting of the separate pads and another period of operation of the cooler apart from each period of wetting.

12. The method of claim 2, when applied to an evaporative cooler comprising a plurality of separate evaporative pad sets and wherein each pad set includes an associated separately controllable fan or dampener system for varying the airflow therethrough.

13. The control system as claimed in claim 5, including fixed timers for controlling each period of wetting and each period between each wetting.

14. The control system as claimed in claim 6, including fixed timers for controlling each period of wetting and each period between each wetting.

15. The control system as claimed in claim 7, including fixed timers for controlling each period of wetting and each period between each wetting.

16. The control system as claimed in claim 8, including fixed timers for controlling each period of wetting and each period between each wetting.

17. The control system as claimed in claim 5, including a transducer adapted to continuously measure psychrometric properties of air upstream of each pad and applying those measurements to the control system, the control system employing those measurements to estimate the rate of water evaporation from the pads during operation of a cooler between wetting sequences and adjust the time interval between wetting sequences based upon the estimate.

18. The control system as claimed in claim 6, including a transducer adapted to continuously measure psychrometric properties of air upstream of each pad and applying those measurements to the control system, the control system employing those measurements to estimate the rate of water evaporation from the pads during operation of a cooler between wetting sequences and adjust the time interval between wetting sequences based upon the estimate.

19. The control system as claimed in claim 7, including a transducer adapted to continuously measure psychrometric properties of air upstream of each pad and applying those measurements to the control system, the control system employing those measurements to estimate the rate of water evaporation from the pads during operation of a cooler between wetting sequences and adjust the time interval between wetting sequences based upon the estimate.

20. The control system as claimed in claim 8, including a transducer adapted to continuously measure psychrometric properties of air upstream of each pad and applying those measurements to the control system, the control system employing those measurements to estimate the rate of water evaporation from the pads during operation of a cooler between wetting sequences and adjust the time interval between wetting sequences based upon the estimate.

\* \* \* \* \*